(12) United States Patent  
Johnson

(10) Patent No.: US 7,520,575 B2  
(45) Date of Patent: Apr. 21, 2009

(54) TENSION MANAGEMENT SYSTEM FOR AN ENDLESS TRACK OF A WORK MACHINE

(75) Inventor: Gary Dean Johnson, Spirit Lake, IA (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 11/771,248

(22) Filed: Jun. 29, 2007

(65) Prior Publication Data

US 2009/0001809 A1 Jan. 1, 2009

(51) Int. Cl.
*B62D 55/30* (2006.01)

(52) U.S. Cl. ........................ 305/144; 305/125

(58) Field of Classification Search ............... 305/125, 305/134, 143, 144, 145, 146, 153, 155, 130, 305/131, 132, 133, 147, 152; 180/9.5, 9.52, 180/9.62, 9.64
See application file for complete search history.

(56) References Cited

U.S. PATENT DOCUMENTS

| | | | | |
|---|---|---|---|---|
| 2,504,128 A * | 4/1950 | Jacobson et al. | ......... | 305/9 |
| 4,650,260 A * | 3/1987 | Satzler | ......... | 305/155 |
| 4,840,437 A * | 6/1989 | Henry et al. | ......... | 305/144 |
| 5,452,949 A * | 9/1995 | Kelderman | ......... | 305/129 |
| 5,927,412 A * | 7/1999 | Crabb | ......... | 180/9.44 |
| 6,315,374 B1 * | 11/2001 | Johansson | ......... | 305/145 |
| 6,810,975 B2 * | 11/2004 | Nagorcka et al. | ......... | 180/9.5 |
| 6,962,222 B2 * | 11/2005 | Kirihata | ......... | 180/9.46 |
| 2008/0084111 A1 * | 4/2008 | Rainer | ......... | 305/124 |

FOREIGN PATENT DOCUMENTS

JP 04274975 A * 9/1992

* cited by examiner

*Primary Examiner*—Jason R Bellinger
*Assistant Examiner*—Kip T Kotter
(74) *Attorney, Agent, or Firm*—Ryan A. Schneider, Esq.; Troutman Sanders LLP

(57) ABSTRACT

A tension management system for generating tension in an endless track of a tracked work machine. The tension management system comprises a biasing element, an idler wheel, a swing link, an idler arm, and a pivotal bracket linking the biasing element with the idler arm. The biasing element generates force that is translated via the biasing arm to the pivotal bracket. The pivotal bracket provides a mechanical advantage in the translation of the force that enables the force exerted upon the swing link to be greater than the force generated by the biasing element. The idler arm connects the pivotal bracket to the swing link and exerts force on the swing link causing it to pivot. The idler wheel is mounted on the swing link and exerts force, generating tension, in the endless track as the swing link pivots. The tension management system enables a greater force to be exerted on the swing link than is generated by the biasing element, allowing for the use of smaller biasing elements than previously possible in conventional designs.

14 Claims, 4 Drawing Sheets

TENSION MANAGEMENT SYSTEM FOR AN ENDLESS TRACK OF A WORK MACHINE

BACKGROUND OF THE INVENTION

1. Field of the Invention

The present invention relates to systems for generating tension in the endless track of a tracked work machine.

2. Description of Related Art

Tracked work machines are a staple in the military, construction, agriculture, mining, lumber, and other heavy industries. Tracked work machines range in shape and size from tanks and bulldozers to backhoes, mobile cranes, snowmobiles, and robots. These machines are prized for their superior maneuverability over rough terrain, enabled primarily by their tracked means of movement.

Such work machines generally comprise a main frame or chassis, an engine or motor, a drive mechanism, and a tension management system. The frame or chassis is the main frame of the machine, upon which the other components are directly or indirectly mounted. For example, the engine or motor is mounted to the main frame. The drive mechanism comprises a drive mechanism frame coupled to the main frame, a drive wheel, an endless track, and a set of rollers or wheels. Two drive mechanisms are typically employed in a tracked work machine, one on each side of the machine.

The drive wheel is driven by the engine or motor. The drive wheel is in operative communication with an endless track. Further, the rollers or wheels are distributed along the drive mechanism frame over which the endless track passes. The rollers and drive wheel are distributed to define the path for the endless track to follow. The engine or motor generates rotation of the drive wheel, which in turn results in complimentary rotation of the endless track.

Maintaining proper tension of the endless track is necessary for the proper operation of the work machine. If the tension is too low the endless track may buckle, slip off the drive wheel and rollers, jump between teeth on a sprocket drive wheel or roller, or not generate enough friction with the drive wheel to allow for rotation. Alternatively, if the tension is too high, premature wear may occur in components of the drive mechanism.

It is also important for the tension to be readily adjustable to prevent damage caused by debris passing between the endless track, and drive wheels, and rollers. Proper tension is also necessary for maintaining balance and stability during uphill or downhill movement, and during digging or other operations.

The tension management system of the tracked work machine maintains tension in the endless track of the drive mechanism. The tension management system comprises an idler wheel, a biasing element, and intermediary components for translating force from the biasing element to the idler wheel. The idler wheel is coupled to the drive mechanism frame in a manner that enables its position to be adjusted, which provides regulation for the tension in the endless track. The idler wheel is coupled to the biasing element, which generates force and adjusts the idler wheel's position. The biasing element presses the idler wheel against the endless track to increase tension in the endless track. The biasing element also actively or passively enables the idler wheel to ease away from the endless track to reduce tension in the track.

The large size and heavy loads of work machines require relatively high tension in the endless tracks. The connection between the biasing element and the idler wheel of the tension management system in conventional tension management systems is directly linear. FIG. 1 illustrates such conventional systems wherein a biasing element 10 is directly connected to a swing link 20. The force from the biasing element is translated in a linear manner. Examples of such arrangements of the idler wheel and biasing element in the prior art can be found in U.S. Pat. No. 7,172,257 to Tamaru et al. and U.S. Pat. No. 5,851,058 to Humbek et al. The biasing element in such conventional work machines is often a hydraulic or pneumatic pump or a set of powerful springs. Such elements are expensive and prone to frequent damage, necessitating repair or replacement due to the extreme forces being generated.

Until now, there has existed a need for a tension management system that can maintain proper tension in an endless track using a lightweight, less expensive biasing element than currently known. It is to such a tension management system that the present invention is primarily directed.

BRIEF SUMMARY OF THE INVENTION

The present invention is a tension management system for the endless track of a work machine. The exemplary embodiments of the present invention provide a tension management system for an endless track of a work machine, wherein the required tension is regulated with a smaller force produced by the biasing element than in conventional systems by employing the mechanical advantage of a pivotal bracket linking the idler wheel and biasing element.

An exemplary embodiment of a tension management system according to the present invention comprises an idler wheel, a swing link, an idler arm, a pivotal bracket, a biasing element, and a biasing arm. The components of the tensions management system are coupled to the drive mechanism frame. The biasing element generates force, which moves the biasing arm. The biasing arm is connected to the pivotal bracket. Movement of the biasing arm causes the pivotal bracket to pivot about its connection to the drive mechanism frame. The pivoting of the pivotal bracket translates the force from the biasing element into movement of the idler arm. The idler arm is mounted on the swing link. The swing link is pivotally connected to the drive mechanism frame. As the idler arm moves, it causes the swing link to pivot about its connection to the drive mechanism frame in a direction away from the biasing element. As the swing link pivots, the idler wheel presses against and exerts force on the endless track, generating tension. Conversely, the swing link may pivot toward the biasing element, causing the idler wheel to ease off the track, lessening the tension.

In a further aspect of the invention, in the normal working position shown, the distance between the connection point of the pivotal bracket to the drive mechanism frame and connection point of the pivotal bracket to the biasing arm is greater than the distance between the connection point of the pivotal bracket to the drive mechanism frame and connection point of the pivotal bracket to the idler arm. Thus, the biasing arm has a greater moment arm than the idler arm about the connection of the pivotal bracket to the drive mechanism frame. As a result, force generated by the biasing element and exerted upon the pivotal bracket translates into a greater force in the idler arm. This allows for a greater force to be exerted on the swing link than is generated by the biasing element.

In a further aspect of the invention, the biasing element may be an air spring. In conventional work machines, an air spring is not capable of generating sufficient force to produce the required tension in the endless track. However, the mechanical advantage of the different moment arms of the present invention's biasing arm and idler arm enable a greater force to be exerted against the swing link than is generated by the biasing element. This enables the use of biasing elements such as an air spring, which previously would not have been available due to their limited force generation capacity.

These and other features as well as advantages, which characterize various exemplary embodiments of the present invention, will be apparent from a reading of the following detailed description and a review of the associated drawings.

DETAILED DESCRIPTION OF PREFERRED EMBODIMENTS

The various exemplary embodiments of the present invention provide a tension management system for regulating tension in the endless track of a work machine. An exemplary embodiment of the tension management system includes a pivotal bracket that serves as a lever arm for generating a moment of force that is preferably translated into a force acting upon the idler wheel, to generate tension in the endless track. The pivotal bracket enables a greater force to be exerted on the idler wheel than is generated by the biasing element.

An exemplary embodiment of a tension management system comprises an idler wheel, a swing link, an idler arm, a pivotal bracket, a biasing element, and a biasing arm. The biasing element generates force, which moves the biasing arm. The biasing arm is preferably connected to the pivotal bracket. Movement of the biasing arm causes the pivotal bracket to pivot about its connection to the drive mechanism frame. The pivotal bracket is preferably also connected to a swing link by an idler arm. As the pivotal bracket pivots, force is translated from the biasing element to the swing link. The idler wheel is preferably mounted on the swing link. The swing link is preferably pivotally connected to the drive mechanism frame. As the idler arm moves it causes the swing link to pivot about its connection to the drive mechanism frame. As the swing link pivots, the idler wheel exerts force against the endless track, generating tension.

Figure 1:
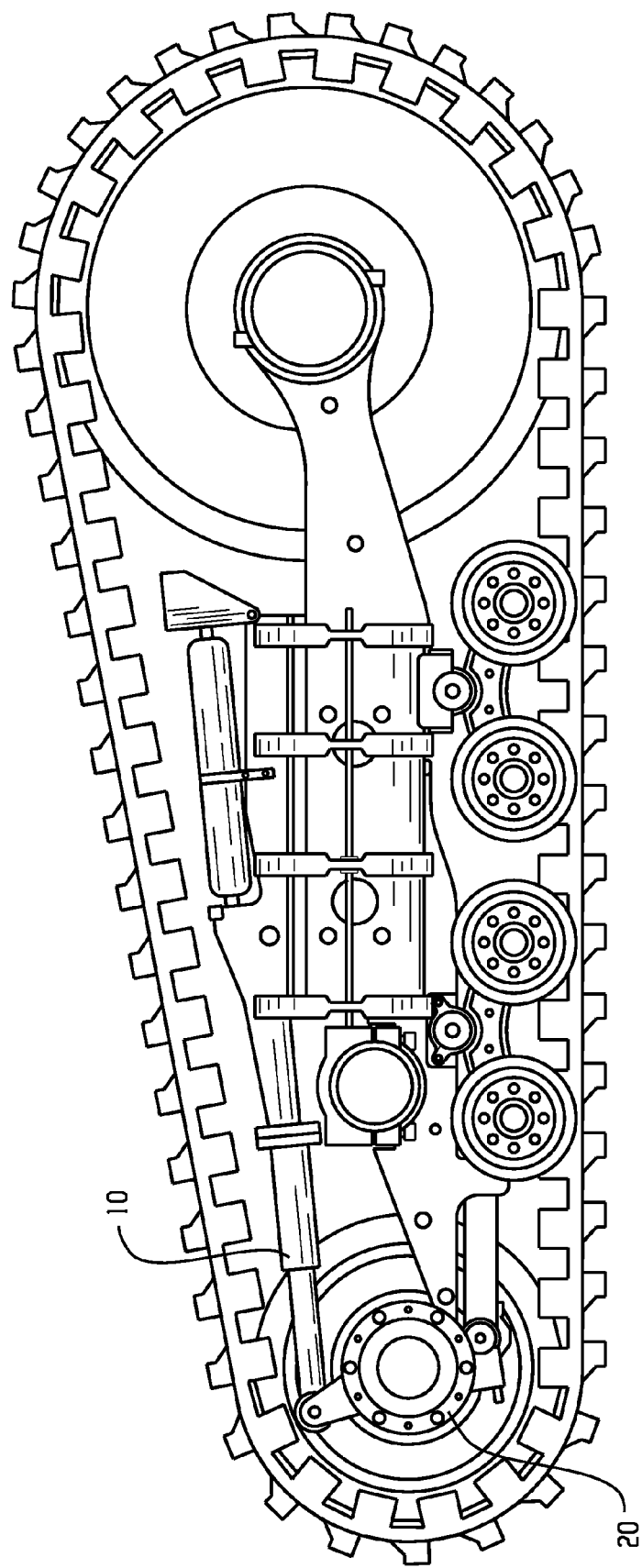
FIG. 1 illustrates the prior art tension management system employed by tracked work machines.
Figure 2:
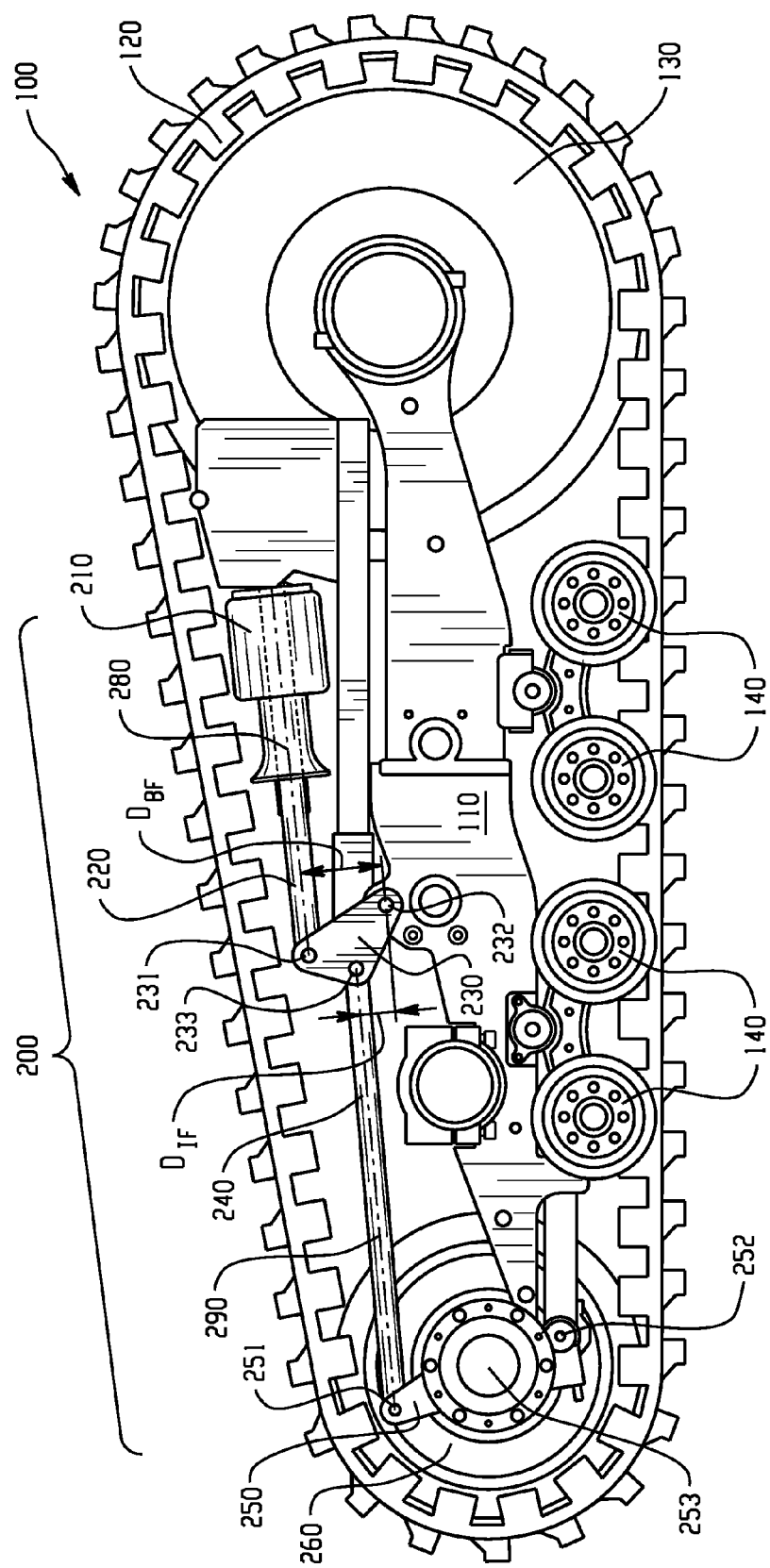
FIG. 2 illustrates an exemplary embodiment of a tension management system within a drive mechanism of a work machine.

FIG. 2 illustrates an exemplary embodiment of the tension management system 200 as employed in cooperation with the drive mechanism 100 of a work machine. The drive mechanism 100 comprises the drive mechanism frame 110, an endless track 120, a drive wheel 130, and rollers 140. The drive mechanism frame 110 is preferably connected to the main chassis or frame (not shown) of the work machine. Elements of the drive mechanism 100 are either connected to the drive mechanism frame 110 or connected directly to the main chassis or frame. The engine or motor (not shown) of the work machine causes the drive wheel 130 to rotate. The drive wheel 130 is preferably in operative communication with the endless track 120. Rotation of the drive wheel 130 causes the endless track 120 to rotate around the drive wheel 130, and rollers 140.

The tension management system 200 comprises a biasing element 210, a biasing arm 220, a pivotal bracket 230, an idler arm 240, a swing link 250, and an idler wheel 260. The biasing element 210 is preferably connected to the frame 110. The biasing element 210 is a mechanical structure that is capable of generating force that may be translated to another element. It is contemplated that the biasing element 210 could be connected to the frame 110 by telescoping rods. A biasing arm 220 communicates between the biasing element 210 and the pivotal bracket 230 at bracket bias connection 231.

The pivotal bracket 230 is preferably substantially flat and constructed from metal or another suitable material. The pivotal bracket 230 is preferably triangular having a top, bottom, and middle corner or portion. The pivotal bracket 230 is preferably connected to the frame at a bracket frame connection 232. The idler arm 240 is preferably connected to the pivotal bracket 230 at a bracket idler connection 233. In other contemplated embodiments, two coplanar pivotal brackets can be employed, and the biasing arm 220, idler arm 240, and portion of the drive mechanism frame 110 connected and partially disposed between the two pivotal brackets.

The idler arm 240 is preferably also connected to the swing link 250 at an idler arm connection 251. The swing link 250 preferably comprises a top, middle, and bottom portion. The idler arm connection 251 is preferably located at the top portion of the swing link 250. The swing link 250 is preferably connected to the frame 110 at a swing frame connection 252. The swing frame connection 252 is preferably located at the bottom portion of the swing link 250. The idler wheel 260 is preferably connected to the swing link 250 at a wheel swing connection 253. Preferably, the idler wheel 260 comprises a bore, and the swing link 250 can comprise a integral pin extending from the swing link 250 into the bore. The wheel swing connection 253 enables the idler wheel 260 to revolve relative to the swing link 250. In other contemplated embodiments, the swing link 250 can comprise a bore, and the idler wheel 250 comprises an integral pin in communication with the bore. In further embodiments, the swing link 250 and idler wheel 250 can comprise coaxial bores, and a pin may span the two bores to enable rotatable communication.

The connections 231, 232, 233, 251, 252, and 253 are preferably pivotal or rotatable. Contemplated fastening means employed in connections 231, 232, 233, 251, 252, and 253 are a pin, bolt, screw, moveable rivet, or other suitable fastener enabling pivotal communication. Other contemplated connection means include coaxial cylindrical bores in the respective elements and corresponding pins inserted through the bores. In other contemplated embodiments, one element may comprise one of more bores and the other element may comprise one or more integral pins in communication with the bores, enabling pivotal communication.

The idler wheel 260 maintains contact with the endless track 120, and its location relative to the drive mechanism defines the tension in the endless track 120. Force from the biasing element 210 is preferably translated by the tension management system 200 to the idler wheel 260. This force presses the idler wheel 260 against the endless track 120, generating tension. The idler wheel's 260 connection to the swing link 250 enables the position of the idler wheel 260 to be adjusted relative to the components of the drive mechanism 100 as the swing link 250 pivots. The wheel swing connection 253 enables the idler wheel 260 to revolve as the endless track 120 passes over it.

Figure 4:
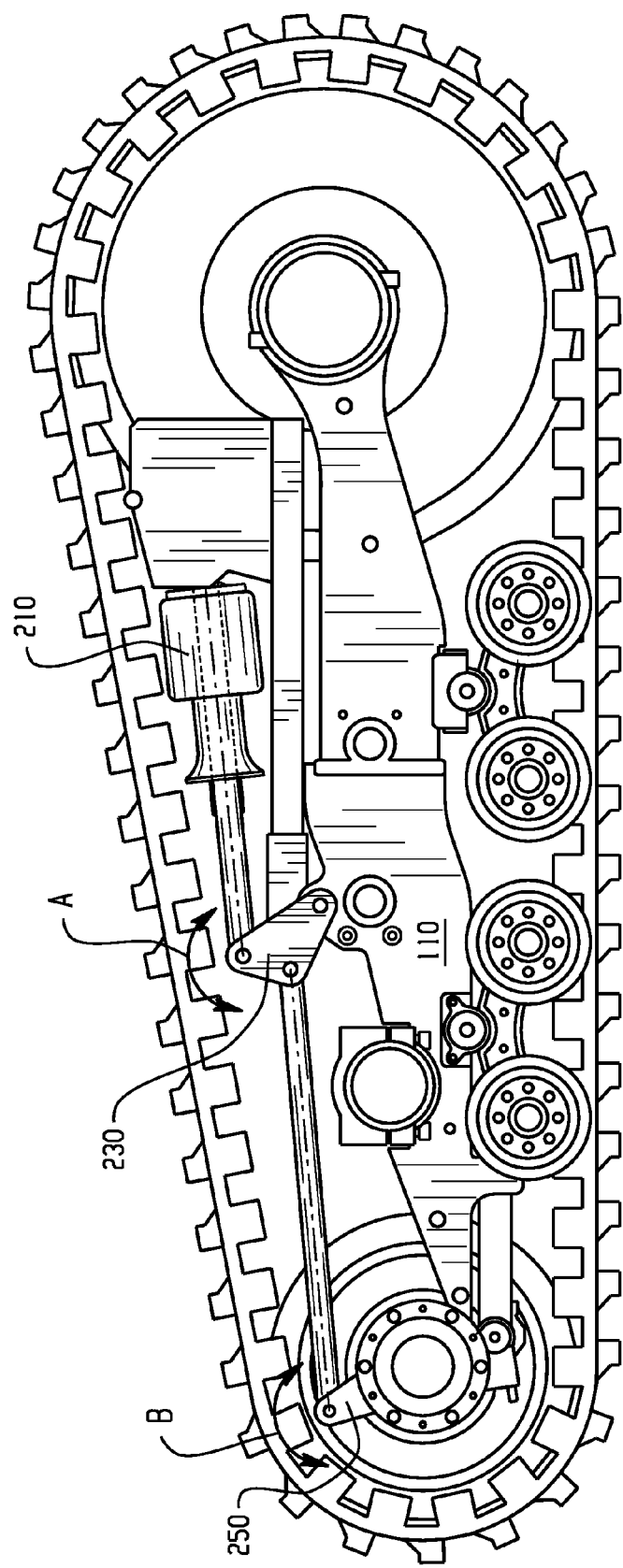
FIG. 4 illustrates an alternate view of an exemplary embodiment of the tension management system within a drive mechanism of a work machine.

As the biasing element 210 generates force, the biasing arm 220 translates toward the pivotal bracket 230. The movement of the biasing arm 220 exerts a force on the pivotal bracket 230 at the bracket bias connection 231. This force causes the pivotal bracket 230 to pivot about the bracket frame connection 232, generating a moment of force. Arrow A in FIG. 4 illustrates the pivoting of the pivotal bracket 230. As the pivotal bracket 230 pivots, it exerts a force upon the idler arm 240 at the bracket idler connection 233. The force causes the idler arm 240 to translate toward the swing link 250. Movement of the idler arm 240 exerts a force on the swing link 250 at the swing link idler arm connection 251. The force causes the swing link 250 to pivot about the swing frame connection 252. Arrow B in FIG. 4 illustrates the pivoting of the swing link 250. As the swing link 250 pivots, it causes the idler wheel 260 to press against and exert force upon the endless track 120, generating tension.

The movements described above are bidirectional. The description above demonstrates the biasing element generating force and translating the force to create tension in the endless track 120. Should a rock or debris enter between the drive wheel 130, rollers 140, or idler wheel 260, the tension would dramatically increase and damage to the endless track 120 could occur, unless the tension is relieved. To prevent such damage the idler wheel 260 is preferably capable of easing away from the endless track 120. The swing link 250, idler arm 240, pivotal bracket 230 and biasing arm 220 would correspondingly move in the opposite direction from that described above. This movement is possible due to the compressible nature of the biasing element 210.

In the normal working position shown, the force exerted on the swing link 250 is preferably greater than the force generated by the biasing element 210. The force generated by the biasing element 210 is preferably amplified through the mechanical advantage of the pivotal bracket 230. The biasing element 210 generates force that is translated by the biasing arm 220 and exerted on the pivotal bracket at bracket bias connection 231. Because pivotal bracket 230 is preferably pivotally connected to the frame at bracket frame connection 232, the force exerted at bracket bias connection 231 causes the pivotal bracket 230 to pivot or rotate. This rotation results in moments of force at connections 231 and 233. The moments of force are a function of the force exerted at the connection multiplied by the moment arm of the connection. Because the system is static, the moments of force are equal. The moment arm at bracket bias connection 231 is equal to the bias frame distance $D_{BF}$, which is the minimum distance between bracket frame connection 232 and the bias arm central longitudinal axis 280. $D_{BF}$ is inherently always defined by a line from the bracket frame connection 232 normal to the bias arm central longitudinal axis 280. Similarly, the moment arm at bracket bias connection 231 is equal to idler frame distance $D_{IF}$, which is the minimum distance between bracket frame connection 232 and the idler arm central longitudinal axis 290. $D_{IF}$ is inherently always defined by a line from the bracket frame connection 232 normal to the idler arm central longitudinal axis 290. Because the bias frame distance $D_{BF}$ is preferably greater than the idler frame distance $D_{IF}$, the force at bracket bias connection 231 translates to a greater force at bracket idler connection 233. The ratio of the force at bracket idler connection 233 to the force at bracket bias connection 231 is equal to the ratio of bias frame distance $D_{BF}$ to idler frame distance $D_{IF}$.

Figure 3A:
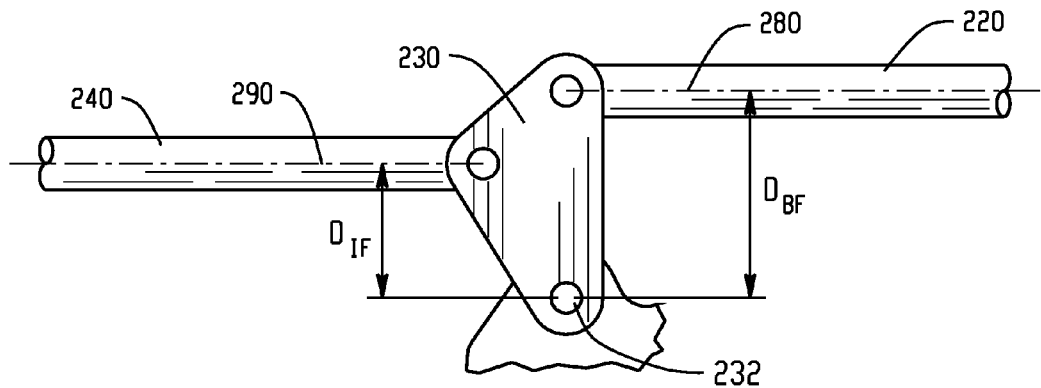
FIG. 3a-c illustrate alternate views of an exemplary embodiment of a pivotal bracket of the tension management system.
Figure 3B:
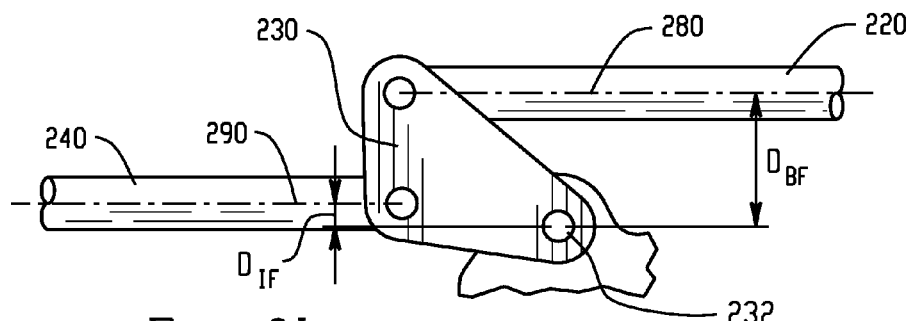
Figure 3C:
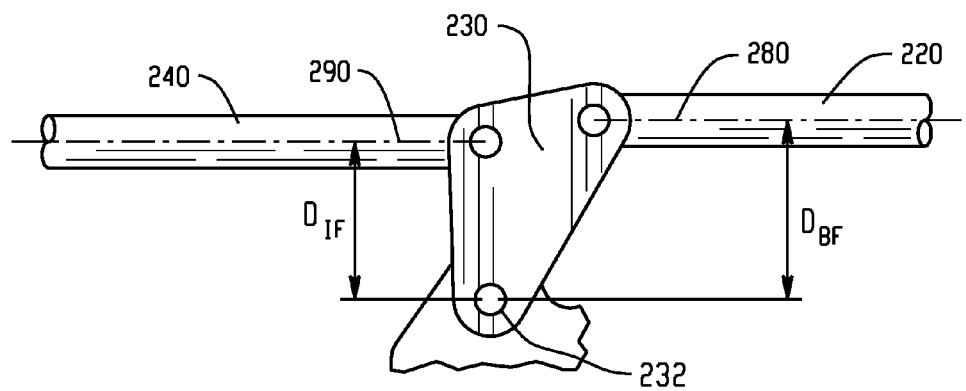

The bias frame distance $D_{BF}$ and the idler frame distance $D_{IF}$ both vary as the pivotal bracket 320 pivots. FIG. 3a illustrates the distances $D_{BF}$ and $D_{IF}$ in a normal working position. FIG. 3b illustrates the distances $D_{BF}$ and $D_{IF}$ wherein the pivotal bracket 230 has significantly pivoted counterclockwise. As a result, both $D_{BF}$ and $D_{IF}$ have decreased compared to the normal working position. FIG. 3c illustrates the distances $D_{BF}$ and $D_{IF}$ wherein the pivotal bracket 230 has pivoted clockwise. As a result, $D_{BF}$ has decreased and $D_{IF}$ has increased compared to the normal working position. Since the moment arms of the pivotal bracket 230 change during operation, the mechanical advantage of the pivotal bracket 230 varies correspondingly. Therefore, the ratio of the force at bracket idler connection 233 to the force at bracket bias connection 231, which equal to $D_{BF}/D_{IF}$, changes as well during operation. It is clear from FIGS. 3a-c that while the distances $D_{BF}$ and $D_{IF}$ change, they remain defined by lines from the bracket frame connection 232 normal to the bias arm central longitudinal axis 280 and idler arm central longitudinal axis 290, respectively.

In an exemplary embodiment, the pivotal bracket 230 is preferably triangular in shape. The connections 231, 232, and 233 are preferably located at or near the corners of the triangle. In other contemplated embodiments, the pivotal bracket 230 may be a different shape other than a triangle. For example, the pivotal bracket may be circular, oblong, elliptical, rectangular, square, polygonal, or another suitable regular or irregular shape. In the contemplated embodiments, the bias frame distance $D_{BF}$ is preferably also greater than the idler frame distance $D_{IF}$.

In an exemplary embodiment, the components of the drive mechanism 100 and tension management system 200 are preferably metal, such as high tensile steel. Other contemplated embodiments could incorporate components constructed from other metals and alloys such as stainless steel, iron, titanium, glassy metal, amorphous noncrystalline metal, or other suitable materials.

In an exemplary embodiment, the biasing element 210 is preferably an air spring. In conventional tension management systems, an air spring would not be capable of generating sufficient force to produce the necessary tension in the endless track. In the various exemplary embodiments of the present invention, the forced generated by the biasing element 210 is preferably magnified by the pivotal bracket 230. Consequently, a smaller force generated by the biasing element 210 may be sufficient to generate the tension necessary in the endless track 120. This allows for a smaller biasing element 210, such as an air spring, to be employed in the tension management system 200 than was possible in conventional designs. A smaller biasing element is advantageous since it is less expensive, lighter, easier to repair, and less prone to damage since it is not subject to large work forces.

The air pressure within an air spring can be adjusted to generate a desired spring rate and a corresponding force generated by the air spring. The force generated by the air spring is translated into tension in the endless track as described above. In other contemplated embodiments, the biasing element 210 may be a coiled steel spring, specialty rubber spring, hydraulic cylinder and accumulator combo, electric motor, air cylinder, pneumatic pump, or other element capable of generating force and/or resistance. In a further embodiment of the present invention, shields may be provided around the biasing element 210 to protect it and increase its reliability. In a further embodiment of the present invention, the pivotal bracket may be replaced with a cam mechanism.

The embodiments of the present invention are readily ascertainable by one of ordinary skill in the art. Likewise, modifications, substitutions of equivalent parts, and various design choices are also ascertainable. Thus, the following claims are intended to cover the entire scope of the invention as interpreted by a person having ordinary skill in the art and not merely limit the invention to the verbatim incarnation described and illustrated above.

What is claimed is:

1. A tension management system for an endless track comprising:

a biasing element generating a first force;
a swing link having a top portion, a middle portion, and a bottom portion;
a pivotal bracket, pivotally connected to a drive mechanism frame;
a biasing arm, having a central longitudinal axis, a first end of the biasing arm connected to the biasing element and a second end connected to the pivotal bracket;
an idler arm, having a central longitudinal axis, a first end of the idler arm connected to the pivotal bracket and a second end connected to the swing link; and
an idler wheel, connected to the swing link;
wherein a second force exerted by the idler arm at the connection between the swing link and the idler arm is greater than the first force generated by the biasing element;
wherein the shape of the pivotal bracket is triangular and the idler arm, biasing arm, and drive mechanism frame are each connected to the pivotal bracket at a different corner;
wherein the swing link is pivotally connected to the drive mechanism frame; and
wherein the bottom portion of the swing link is pivotally connected to the drive mechanism frame, and the second end of the idler arm is pivotally connected to the top portion of the swing link.

2. The tension management system according to claim 1, wherein the swing link and the idler arm, idler arm and pivotal bracket, and pivotal bracket and biasing arm are in pivotal communication.

3. The tension management system according to claim 1, wherein the biasing element is an air spring.

4. The tension management system according to claim 1, wherein the minimum distance between the connection point of the pivotal bracket to the drive mechanism frame and the central longitudinal axis of the biasing arm is greater than the minimum distance between the connection point of the pivotal bracket to the drive mechanism frame and the central longitudinal axis of the idler arm.

5. A tension management system for an endless track comprising:
a biasing element generating a first force;
a swing link;
a pivotal bracket, pivotally connected to a drive mechanism frame;
a biasing arm, having a central longitudinal axis, a first end of the biasing arm connected to the biasing element and a second end connected to the pivotal bracket;
an idler arm, having a central longitudinal axis, a first end of the idler arm connected to the pivotal bracket and a second end connected to the swing link; and
an idler wheel, connected to the swing link;
wherein the force exerted at the connection between the swing link and the biasing element is greater than the force generated by the biasing element;
wherein the shape of the pivotal bracket is triangular and the idler arm, biasing arm, and drive mechanism frame are each connected to the pivotal bracket at a different corner;
wherein the swing link is pivotally connected to a drive mechanism frame; and
wherein a second force exerted by the idler arm on the swing link is greater than the first force exerted by the biasing element on the pivotal bracket.

6. The tension management system according to claim 5, wherein the swing link and the idler arm, idler arm and pivotal bracket, and pivotal bracket and biasing arm are in pivotal communication.

7. The tension management system according to claim 5, wherein the biasing element is an air spring.

8. A tension management system for an endless track comprising:
a biasing element generating a first force;
a swing link;
a pivotal bracket, pivotally connected to a drive mechanism frame;
a biasing arm, having a central longitudinal axis, a first end of the biasing arm connected to the biasing element and a second end connected to the pivotal bracket;
an idler arm, having a central longitudinal axis, a first end of the idler arm connected to the pivotal bracket and a second end connected to the swing link; and
an idler wheel, connected to the swing link;
wherein a second force exerted by the idler arm at the connection between the swing link and the idler arm is greater than the first force generated by the biasing element;
wherein the shape of the pivotal bracket is triangular and the idler arm, biasing arm, and drive mechanism frame are each connected to the pivotal bracket at a different corner;
wherein the swing link is pivotally connected to a drive mechanism frame; and
wherein the ratio of the force exerted on the swing link by the idler arm to the force generated by the biasing element is equal to the ratio of a first distance, the first distance defined by the minimum distance between the connection point of the pivotal bracket to the drive mechanism frame and the central longitudinal axis of the biasing arm, to a second distance, the second distance defined by the minimum distance between the connection point of the pivotal bracket to the drive mechanism frame and the central longitudinal axis of the idler arm.

9. The tension management system according to claim 8, wherein the swing link and the idler arm, idler arm and pivotal bracket, and pivotal bracket and biasing arm are in pivotal communication.

10. The tension management system according to claim 8, wherein the biasing element is an air spring.

11. A method of adjusting the tension in an endless track comprising:
connecting a biasing element to a drive mechanism frame;
pivotally connecting a swing link having a top portion, a middle portion, and a bottom portion to the drive mechanism frame;
connecting the biasing element to a pivotal bracket, using a biasing arm having a central longitudinal axis;
pivotally connecting the pivotal bracket to the drive mechanism frame;
connecting the swing link to the pivotal bracket, using an idler arm having a central longitudinal axis;
translating a first force generated by the biasing element to the pivotal bracket, causing the pivotal bracket to pivot about its connection to the drive mechanism frame;
translating the force exerted up on the pivotal bracket to a second force exerted upon the swing link, causing it to pivot about its connection to the drive mechanism frame;
connecting a first end of the biasing arm to the biasing element;
connecting a second end of the biasing arm to the pivotal bracket;

connecting a first end of the idler arm to the swing link;
connecting a second end of the idler arm to the pivotal bracket;
boring three holes in the pivotal bracket;
boring holes in the biasing arm and idler arm;
aligning coaxially a hole in the pivotal bracket with a hole in the biasing arm and a hole in the pivotal bracket with a hole in the idler arm;
inserting pins through the coaxially aligned holes to establish a pivotal connection; and
inserting a pin integral to the drive mechanism through a hole in the pivotal bracket to establish a pivotal connection;
wherein the shape of the pivotal bracket is triangular and the idler arm, biasing arm, and drive mechanism frame are each connected to the pivotal bracket at a different corner; and
wherein the force exerted upon the connection between the biasing element and the swing link is greater than the force generated by the biasing element.

12. The method according to claim 11, further comprising:
a first distance, the first distance defined by the minimum distance between the connection point of the pivotal bracket to the drive mechanism frame and the central longitudinal axis of the biasing arm, and a second distance, the second distance defined by the minimum distance between the connection point of the pivotal bracket to the drive mechanism frame and the central longitudinal axis of the idler arm,
wherein the first distance and second distance vary as the pivotal bracket pivots.

13. The method according to claim 12, further comprising:
translating the first force into a moment force;
translating the moment force into a second force;
exerting the second force on the swing link;
wherein the ratio of the first force to the second force is equal to the ratio of the second distance to the first distance, and varies as the first and second distances vary.

14. The method of claim 11, further comprising:
pivotally connecting the bottom portion of the swing link directly to the drive mechanism frame;
connecting the top portion of the swing link to the pivotal bracket; and
rotatably connecting an idler wheel to the middle portion of the swing link.

* * * * *